United States Patent Office 2,824,131
Patented Feb. 18, 1958

2,824,131

PRODUCTION OF HIGH MOLECULAR WEIGHT ALCOHOLS FROM ETHYLENE AND OXYGEN

Albert Di Nardo, Jamaica Plain, James H. Gardner, Weston, Nat C. Robertson, Wellesley, and Charles I. Tewksbury, Chestnut Hill, Mass., assignors, by mesne assignments, to Escambia Chemical Corporation, Pace, Fla., a corporation of Delaware No Drawing. Application December 29, 1955
Serial No. 556,078

7 Claims. (Cl. 260—533)

This invention relates to the production of chemicals and in particular to the conversion of ethylene to useful polymeric materials.

A principal object of the present invention is to provide a method for producing good yields of oxygenated polymeric materials by the oxidative polymerization of ethylene.

Still another object of the present invention is to produce novel polymeric materials and derivatives thereof.

Other objects of the invention will in part be obvious and will in part appear hereinafter.

The invention accordingly comprises the process involving the several steps and the relation and the order of one or more of such steps with respect to each of the others and the product possessing the features, properties and relation of components which are exemplified in the following detailed disclosure, and the scope of the application of which will be indicated in the claims.

For a fuller understanding of the nature and objects of the invention, reference should be had to the following detailed description.

The present invention is directed to the manufacture of valuable polymeric materials containing between about 5 and 25 percent oxygen by the oxidative polymerization of ethylene. These polymeric materials are preferably obtained by reacting ethylene with elemental oxygen in the presence or absence of an inert organic solvent at ethylene partial pressures between about 500 and 5000 p. s. i. and at elevated temperatures on the order of 180° C. and above to oxidize and polymerize the ethylene to polymeric materials with an average molecular weight above 200 and containing between 5 and 25 percent oxygen.

The polymeric materials, as obtained from the above reaction, comprise compounds containing from 2 to 60 or more ethylene residues per molecule. The quantity of oxygen present in the polymeric materials lies between about 5 and 25 percent. The polymeric materials contain, on the average, between 1 to 3 oxygen atoms per molecule of polymer. This oxygen is incorporated in the polymer as part of the ester linkages, hydroxy groups (primary and secondary), carboxy groups, carbonyl groups and alkoxy groups which are found to be present. The polymer contains, on the average, at least one oxygenated functional group per molecule and an appreciable proportion of the molecules present may be difunctional. The polymer molecules may also contain double bonds. The average molecular weight of the polymer has been found to be consistently above about 200 and generally on the order of between about 200 to 600. This high-molecular-weight polymeric material may range in character from a liquid to a waxy or semi-solid.

The polymeric material may be subjected to a wide range of subsequent modification treatments with or without preliminary partial separation of its constituents. Examples of further modification treatments are reduction or hydrogenation, oxidation, hydrogenolysis, acetylation or combinations of these reactions. For example, when alcohols are the desired end products, the polymer is subjected to a reduction step so as to reduce carbonyl and ester groups to hydroxy groups. This may be, for example, a hydrogenation in the presence of copper chromite or a Raney nickel catalyst or may be a reduction with a metallic reducing agent such as sodium. Copper chromite is preferred as a hydrogenation catalyst as it achieves a more complete reduction of the reducible groups of the polymer. When monobasic or dibasic acids are the desired end product, the polymer may be directly oxidized to the corresponding acids. In some cases, it may be desirable that the carbon-to-carbon double bonds present in the polymer be saturated with hydrogen prior to any extensive modification of the polymer.

The polymers produced by the present invention, and particularly their alcohol and acid derivatives, have considerable utility. They may be used as components of synthetic lubricants, viscosity index improvers and pour point depressants for petroleum lubricants. Accordingly, fairly wide ranges of molecular structures and molecular weights may be utilized. The same is often generally true of the use of these materials as plasticizers. The polymeric acids and alcohols may also be more closely fractionated to provide valuable chemical intermediates for the manufacture of resins such as polyesters and the like. Equally, these materials may be converted to synthetic detergents, emulsifiers, wetting agents and surface active materials in general.

Specific detailed methods of practicing the present invention are set forth in the following non-limiting examples.

*Example I*

The organic solvent, 750 cc. of benzene, and 1.4 grams of manganese propionate catalyst were charged to a high pressure reactor with a volume of about 0.1 cubic foot. The reactor was sealed and put under about 900 p. s. i. of nitrogen and brought up to the operating temperature of about 220° C. Ethylene was charged to the reactor to bring the pressure up to about 3100 p. s. i. and the pressure relief valve was then adjusted to maintain this pressure. Ethylene was fed to the reactor at a rate of about 40 standard cubic feet per hour per cubic foot of reactor, along with a steady rate of air feed also of about 40 standard cubic feet per hour per cubic foot of reactor. The ethylene feed rate was such that the ethylene partial pressure was maintained at about 1400 p. s. i. throughout the reaction. During a run of about two hours' duration, 284 grams of ethylene were fed to the reactor. After termination of the run, the polymeric materials formed were recovered from the benzene solvent. The above run produced about 84 grams of a waxy polymeric oxygenated material per standard cubic foot of oxygen fed. This waxy polymeric material had an average molecular weight on the order of about 455 and contained about 13 percent oxygen.

*Example II*

A high pressure reactor with a volume of about 0.1 cubic foot was sealed and put under about 900 p. s. i. of nitrogen and brought up to the operating temperature of about 220° C. Ethylene was then charged to the reactor to bring the pressure up to about 3000 p. s. i. and the pressure relief valve was then adjusted to maintain this pressure. No solvent was employed in this run. Ethylene was fed to the reactor at a rate of about 40 standard cubic feet per hour per cubic foot of reactor, along with a steady rate of air feed also of about 40 standard cubic feet per hour per cubic foot of reactor. The ethylene feed rate was such that the ethylene partial pressure was maintained at about 1300 p. s. i. throughout the reaction. During a run of about two hours duration, 284 grams of ethylene were fed to the reactor. The above run produced about 58.0 grams of a waxy polymeric oxygenated material per standard cubic foot of oxygen fed. This polymeric material had an average molecular weight on the order of about 470 and contained about 12 percent oxygen.

90 grams of the above polymeric oxygenated material were hydrogenated at about 220° C. under 4000 to 5000 p. s. i. for 20 hours in 150 cc. of absolute methanol using 90 grams of a copper chromite catalyst. After separation of the catalyst and recovery of the reaction products, there was obtained an alcohol mixture containing about 62 percent primary alcohols and about 38 percent secondary alcohols.

*Example III*

The organic solvent, 750 cc. of benzene, and 1.4 grams of manganese propionate catalyst were charged to a high pressure reactor with a volume of about 0.1 cubic foot. The reactor was sealed and put under about 600 p. s. i. of nitrogen and brought up to the operating temperature of about 220° C. Ethylene was charged to the reactor to bring the pressure up to about 2000 p. s. i. and the pressure relief valve was then adjusted to maintain this pressure. Ethylene was fed to the reactor at a rate of about 40 standard cubic feet per hour per cubic foot of reactor, along with a steady rate of air feed also of about 40 standard cubic feet per hour per cubic foot of reactor. The ethylene feed rate was such that the ethylene partial pressure was maintained at about 1000 p. s. i. throughout the reaction. During a run of one hour duration, 142 grams of ethylene were fed to the reactor. After termination of the run, the liquid polymeric material was recovered from the benzene solvent. The above run produced about 40.1 grams of a liquid polymeric oxygenated material per standard cubic foot of oxygen fed. This liquid polymeric material had an average molecular weight on the order of about 250 and contained about 15 percent oxygen.

86.6 grams of the above liquid polymeric oxygenated material were hydrogenated at about 220° C. under 4000 to 5000 p. s. i. for 20 hours in 150 cc. of absolute methanol using 86.6 grams of a copper chromite catalyst. After separation of the catalyst and recovery of the reaction products, an alcohol mixture containing about 80 percent primary alcohols and about 20 percent secondary alcohols was obtained.

*Example IV*

A similar oxidation of ethylene was carried out under essentially the same conditions (of temperature, pressure, ethylene and air feed rates, etc.) as were present in Example III except that the duration of the run was about six hours. The liquid polymeric oxygenated material produced in this run had an average molecular weight on the order of about 220 and contained about 20 percent oxygen.

A similar reduction of this liquid polymer was carried out under essentially the same conditions as were present in Example III. After separation of the catalyst and recovery of the reaction products, an alcohol mixture containing about 40 percent primary alcohols and about 60 percent secondary alcohols was obtained.

*Example V*

A similar oxidation of ethylene was carried out under essentially the same conditions (of temperature, pressure, catalyst, solvent, ethylene and air feed rates, etc.) as were present in Example III except that the duration of the run was only about one-half hour. The ethylene partial pressure was maintained at about 1000 p. s. i. during the run. This run produced about 45.0 grams of a liquid polymeric oxygenated material per standard cubic foot of oxygen fed. This liquid polymeric material had an average molecular weight on the order of about 270 and contained about 13 percent oxygen.

*Example VI*

A similar oxidation of ethylene was carried out under essentially the same conditions (of temperature, pressure, catalyst, ethylene and air feed rates, etc.) as were present in Example III except that the duration of the run was about two hours. The ethylene partial pressure was maintained at about 1000 p. s. i. during the run. This run produced about 44.4 grams of a liquid polymeric oxygenated material per standard cubic foot of oxygen fed. This liquid polymeric material had an average molecular weight on the order of about 285 and contained about 16 percent oxygen.

*Example VII*

A high pressure reactor with a volume of about 0.1 cubic foot was sealed and put under about 900 p. s. i. of nitrogen and brought up to the operating temperature of about 220° C. Ethylene was then charged to the reactor to bring the pressure up to about 3000 p. s. i. and the pressure relief valve was then adjusted to maintain this pressure. No solvent was employed in this run. Ethylene was fed to the reactor at a rate of about 40 standard cubic feet per hour per cubic foot of reactor, along with a steady rate of air feed also of about 40 standard cubic feet per hour per cubic foot of reactor. The ethylene feed rate was such that the ethylene partial pressure was maintained at about 1500 p. s. i. throughout the reaction. During a run of about one-half hour duration, 71 grams of ethylene were fed to the reactor. The above run produced about 14 grams of a polymeric oxygenated material per standard cubic foot of oxygen fed. This polymeric material had an average molecular weight on the order of about 500 and contained about 9 percent oxygen.

*Example VIII*

A high pressure reactor with a volume of about 0.1 cubic foot was sealed and put under an ethylene partial pressure of about 1000 p. s. i. The reactor was then brought up to the operating temperature of about 220° C. No solvent was employed in this run. Ethylene was fed to the reactor at a rate of about 72 standard cubic feet per hour per cubic foot of reactor, along with a steady rate of oxygen feed of about 8 standard cubic feet per hour per cubic foot of reactor. The ethylene feed was such that the ethylene partial pressure was maintained at about 1000 p. s. i. throughout the reaction. The above run produced about 90.5 grams of a polymeric oxygenated material per standard cubic foot of oxygen fed. This polymeric material had an average molecular weight on the order of about 300 and contained about 8.5 percent oxygen.

While several limited examples of the present invention have been discussed above, it should be pointed out that numerous modifications may be made without departing from the scope of the invention. For instance, it has been illustrated that the oxidative polymerization of ethylene can be carried out either in the presence or absence of solvents to produce substantially similar polymers. In addition to the use of the preferred solvent, benzene, numerous other solvents can also be employed in the reaction. Examples of suitable solvents are diphenyl, paraffin hydrocarbons not containing a tertiary carbon and the like. It is preferred that the organic solvent be relatively inert to oxygen at the reaction temperatures and that it not be consumed during the reaction.

With regard to the pressure, it should be pointed out that it is maintained at ethylene partial pressures above 500 p. s. i. and preferably between about 500 and 5000 p. s. i. Ethylene is thus introduced or fed to the reactor at a rate such as to maintain the desired ethylene partial pressure within the reactor relatively constant throughout the reaction. It is evident that this rate, which may vary somewhat during the reaction, will be such as to make up for the loss of ethylene in the purge gas and for that which has reacted.

The elemental oxygen employed in the reaction is considered as an essential reactant to the production of polymeric materials containing between 5 and 25 percent oxygen and not as a mere catalyst. The quantity of elemental oxygen, as also the ethylene desired to be introduced into the reactor, is expressed in terms of unit rate of feed per unit of time per unit of reactor volume. The elemental oxygen is thus preferably continuously introduced or fed to the reactor at a rate of at least one standard cubic foot per hour per cubic foot of reactor. Rates of between about 1 to about 25 standard cubic feet per hour of elemental oxygen per cubic foot of reactor are most suitable for the reaction. In the present invention, the continuous feeding of reactive quantities of elemental oxygen to the reactor is completely different from the initial feeding of only a catalytic quantity of elemental oxygen to initiate a polymerization reaction or the continuous feeding of catalytic quantities of elemental oxygen, which quantities are sufficient to form polymeric materials with only very small amounts of oxygen. The continuous introduction of such appreciable quantities of elemental oxygen into the reaction zone permits the production of novel polymeric materials containing between about 5 and 25 percent oxygen. The elemental oxygen may be derived either from pure oxygen or from elemental-oxygen-containing gases such as air.

It has been found that the ethylene partial pressure exerts the dominant influence on determining the average molecular weight of the polymer. The higher the ethylene partial pressure, the higher the molecular weight of the polymer produced. Low ethylene partial pressures produce predominantly liquid polymers with average molecular weights below those obtained at higher ethylene partial pressures. Examples I, II and VII show that ethylene partial pressures on the order of 1300 to 1500 p. s. i. produced waxy or semi-solid polymers with average molecular weights above 400, while Examples III, IV, V, VI and VIII illustrate that ethylene partial pressures on the order of 1000 p. s. i. produce liquid polymers with average molecular weights above 200 but below 400. The temperature within the reactor is preferably maintained between about 180° C. and 250° C. or higher.

Since prolonged effective reaction times or polymer residence times greatly modify the functional groups of the polymeric material, the total effective reaction time or the residence time of the formed oxygenated polymeric materials in the reaction zone should be controlled so that the recovered polymer contains the desired oxygen content. By thus controlling the oxidative polymerization, it is possible to produce good yields of ethylene polymers containing between 5 and 25 percent oxygen which are more uniform in the character of the oxygenated functional groups present.

In one preferred embodiment of the invention, the reducible oxygenated functional groups present in the oxygenated polymeric materials can be subsequently reduced to high-molecular-weight alcohols containing predominantly primary and secondary hydroxy groups. When it is desired to obtain alcohols containing a very high percentage of primary hydroxy groups, then the oxidative polymerization is controlled so that the oxygen content of the resultant oxygenated polymeric material is quite low, i. e., less than about 15 percent oxygen. Increasing the content of oxygen in the polymeric material results, upon reduction, in a decrease in the percentage of primary hydroxy groups and an increase in the percentage of secondary hydroxy groups present in the alcohols. This concept is clearly illustrated by a comparison of Example III with Example IV. In general, it can be stated that oxygenated polymeric materials with average molecular weights below about 400 should preferably contain less than about 15 percent oxygen if it is desired to obtain alcohol containing high percentages of primary hydroxy groups. Oxygenated polymeric materials with average molecular weights above about 400 should preferably contain less than about 10 percent oxygen if it is desired to obtain primary hydroxy group contents in the alcohol. The process may be carried out either on a batch scale or in a continuous manner.

The various modification procedures are equally subject to considerable variation without departing from the scope of the invention. For example, hydrogenation of the polymeric materials may be achieved in many alternative fashions. For example, the hydrogenation may be carried out in the presence of such catalysts as Raney nickel, finely divided platinum or palladium, oxides (e. g., mixed copper oxide-chromium oxide), etc. Similarly, other reducing agents such as sodium or other metals such as zinc, which are preferably used with an acid such as acetic acid, etc., may be employed in lieu of, or in addition to, the hydrogenation treatment. In regard to oxidation, this may be achieved in numerous fashions, such as by further air or oxygen treatment at elevated temperatures, ozonization, treatment with nitric acid, treatment with sulfur, sulfides and bases such as ammonia or quinoline, or other well-known methods of oxidation. When acetylation of the raw or hydrogenated polymer is desired, this may be achieved by well-known methods such as treatment with acetic anhydride.

Since certain changes may be made in the above process and product without departing from the scope of the invention herein involved, it is intended that all matter contained in the above description shall be interpreted as illustrative and not in a limiting sense.

What is claimed is:

1. In the production of high-molecular-weight alcohols, the process which comprises reacting ethylene and elemental oxygen in a reactor at temperatures above about 180° C., introducing ethylene into the reactor at a rate to maintain therein ethylene partial pressures between about 500 and 5000 p. s. i., continuously introducing elemental oxygen at a rate of between about one and twenty-five standard cubic feet per hour per cubic foot of reactor, continuing the oxidation and polymerization until oxygenated polymeric materials of ethylene with an average molecular weight above 200 and containing between about 5 and 25 percent oxygen are obtained, and reducing substantially all of the reducible functional groups of the polymeric material resulting from the reaction to hydroxy groups to produce alcohols.

2. In the production of high-molecular-weight alcohols, the process which comprises reacting ethylene and elemental oxygen in the vapor phase in a reactor at temperatures above about 180° C., introducing ethylene into the reactor at a rate to maintain therein ethylene partial pressures of between about 500 and 5000 p. s. i., continuously introducing elemental oxygen at a rate of between about one and twenty-five standard cubic feet per hour per cubic foot of reactor, continuing the oxidation and polymerization until oxygenated polymeric materials of ethylene with an average molecular weight above 200 and containing between 5 and 25 percent oxygen are obtained, and reducing substantially all of the reducible functional groups of the polymeric material resulting from the reaction to hydroxy groups to produce alcohols.

3. In the production of high-molecular-weight alcohols, the process which comprises reacting ethylene and elemental oxygen in an organic solvent selected from the group consisting of inert nonalkylated aromatic and inert aliphatic compounds in a reactor at temperatures between about 180° C. and the critical temperature of the solvent, introducing ethylene into the reactor at a rate to maintain therein ethylene partial pressures between about 500 and 5000 p. s. i., continuously introducing elemental oxygen at a rate of between about one and twenty-five standard cubic feet per hour per cubic foot of reactor, continuing the oxidation and polymerization until oxygenated polymeric materials of ethylene with an average molecular weight above 200 and containing between about 5 and 25 percent oxygen are obtained, and reducing substantially all of the reducible functional groups of the polymeric material resulting from the reaction to hydroxy groups to produce alcohols.

4. The process of claim 3 wherein the organic solvent is benzene.

5. In the production of high-molecular-weight alcohols, the process which comprises reacting ethylene and elemental oxygen in a reactor at a temperature above about 180° C., introducing ethylene into the reactor at a rate to maintain therein ethylene partial pressures between about 500 and 1000 p. s. i., continuously introducing elemental oxygen at a rate of between about one and twenty-five standard cubic feet per hour per cubic foot of reactor, continuing the oxidation and polymerization until oxygenated polymeric materials of ethylene with an average molecular weight between about 200 and 400 and containing less than about 15 percent oxygen are obtained, and reducing substantially all of the reducible functional groups of said polymeric materials to hydroxy groups to produce high molecular alcohols containing a predominance of primary hydroxy groups.

6. In the production of high-molecular-weight alcohols, the process which comprises reacting ethylene and elemental oxygen in a reactor at a temperature above about 180° C., introducing ethylene into the reactor at a rate to maintain therein ethylene partial pressures above about 1000 p. s. i., continuously introducing elemental oxygen at a rate of between about one and twenty-five standard cubic feet per hour per cubic foot of reactor, continuing the oxidation and polymerization until oxygenated polymeric materials of ethylene with an average molecular weight above 400 and containing less than about 10 percent oxygen are obtained, and reducing substantially all of the reducible functional groups of said polymeric materials to hydroxy groups to produce high molecular alcohols containing a predominance of primary hydroxy groups.

7. In the production of high-molecular-weight acids, the process which comprises reacting ethylene and elemental oxygen in a reactor at temperatures above about 180° C., introducing ethylene into the reactor at a rate to maintain their ethylene partial pressures between about 500 and 5000 p. s. i., continuously introducing elemental oxygen at a rate of between about one and twenty-five standard cubic feet per hour per cubic foot of reactor, continuing the oxidation and polymerization until oxygenated polymeric materials of ethylene with an average molecular weight above 200 and containing between 5 and 25 percent oxygen are obtained, and oxidizing substantially all of the oxidizable functional groups of the polymeric material resulting from the reaction to carboxy groups to produce acids.

References Cited in the file of this patent

UNITED STATES PATENTS

| | | |
|---|---|---|
| 1,981,819 | Wiezevich et al. | Nov. 20, 1934 |
| 2,153,553 | Fawcett et al. | Apr. 11, 1939 |
| 2,188,465 | Perrin et al. | Jan. 30, 1940 |
| 2,713,071 | Erchak | July 12, 1955 |
| 2,717,910 | Erchak | Sept. 13, 1955 |

OTHER REFERENCES

Lenher: J. A. C. S., vol. 53, pp. 3752–65.